Patented Jan. 18, 1938

2,105,512

UNITED STATES PATENT OFFICE 2,105,512

PRODUCTION OF ALKYL SULPHATES

Carlyle J. Stehman, Dayton, Ohio, assignor to Monsanto Chemical Company, St. Louis, Mo., a corporation of Delaware No Drawing. Application December 16, 1936, Serial No. 116,192

8 Claims. (Cl. 260—99.12)

The present invention relates to an improved process of recovering dialkyl sulphates from crude mixtures resulting after the absorption of an olefin or mixtures of olefins in sulphuric acid.

The object of the invention is to provide an improved method of removing diethyl sulphate from the mixture of ethyl hydrogen sulphate (ethylsulphuric acid) and uncombined sulphuric acid resulting from the absorption of ethylene in sulphuric acid. By means of this improvement it is a further object of the invention to provide a new and more economical process for the production of ethyl alcohol from ethylene and sulphuric acid.

According to the methods at present in use for the production of ethyl alcohol from ethylene, ethylene is absorbed in sulphuric acid, the resulting mixture is hydrolyzed by dilution with water, and the alcohol is distilled from the products of hydrolysis. The residual dilute sulphuric acid must be concentrated for re-use. Such a concentration process is costly and uneconomical.

It is known that diethyl sulphate can be hydrolyzed to ethyl alcohol. Therefore, any process which could advantageously be used to remove diethyl sulphate from the crude mixture containing ethylsulphuric acid and sulphuric acid, without dilution of the acid mixture, would be advantageous inasmuch as the acid mixture could be used directly without concentration for further absorption of ethylene. Such a process would be continuous and would necessitate concentration of only that sulphuric acid resulting from the hydrolysis of diethyl sulphate.

Diethyl sulphate can be separated from the mixture resulting after the absorption of ethylene in sulphuric acid by a number of methods. It would appear that the simplest method would be distillation of the diethyl sulphate from the mixture, but such distillation, even when conducted under subatmospheric pressure, leads to decomposition and formation of polymers. In other methods, wherein the diethyl sulphate is extracted by a solvent such as chloroform, which is immiscible with the acid mixture, the separation is not sufficiently satisfactory for commercial use; generally in such methods it is desirable to dilute the acid mixture to effect the separation, and hence such methods have little advantage, as far as reconcentration of acid is concerned, over those at present in the use for the production of alcohol.

The present invention is based upon the discovery that diethyl sulphate can be recovered substantially completely from the acid absorption mixture by distilling such mixture in the presence of a stripping or entraining agent, preferably one that is immiscible or only slightly miscible with the diethyl sulphate. Kerosene, for example, is an agent of this character. When kerosene is used, the resulting distillate consists of two layers, one containing the diethyl sulphate with a small proportion of dissolved kerosene, and the other containing kerosene with a small proportion of dissolved diethyl sulphate. Since the kerosene layer is re-used in subsequent treatments the small amount of diethyl sulphate remaining dissolved therein does not represent a loss, while the small amount of kerosene remaining dissolved in the diethyl sulphate has no effect on the subsequent hydrolysis to alcohol and can be easily recovered after said hydrolysis. The acid mixture resulting after removal of the diethyl sulphate therefrom can be used directly, with the addition of quantities of fresh acid to make up for that quantity removed as diethyl sulphate, for further absorption of ethylene. Furthermore, since the amount of decomposition and polymer formation is maintained at a minimum by this process, the stripped acid mixture can be used repeatedly. An acid mixture which, by repeated use, has become contaminated by excessive quantities of polymers and solid particles, may be purified by simple filtration through sand or bleaching earth.

The stripping operation can be conveniently performed in a counter-current stripping tower, in which a descending stream of crude acid mixture containing diethyl sulphate at a temperature of about 100° C. meets an ascending stream of hydrocarbon vapors maintained at the same temperature. The zone in which the two streams are impinged is maintained at 100° C. also. The entire system is maintained under the desired reduced pressure. In such an apparatus the ascending stream of hydrocarbon vapors withdraws or entrains the diethyl sulphate contained in the acid mixture and thus strips the acid mixture.

By the stripping procedure of the present invention the equilibrium existing in the acid mixture between diethyl sulphate and ethylsulphuric acid is disturbed as the diethyl sulphate is removed. As a result of this, more diethyl sulphate is obtained than is present in the original mixture resulting after the absorption of ethylene in sulphuric acid.

Instead of kerosene, other stripping agents may be used, for example, other petroleum fractions and ortho- or para-dichlorobenzene. The stripping agent is preferably a stable volatilizable organic liquid and must be substantially nonhydrolyzable and unreactive with sulphuric acid of the concentrations used in the process or with diethyl sulphate. It need not be immiscible with diethyl sulphate, but should be easily separable or recoverable from the alcohol mixture resulting after hydrolysis. Thus, if the stripping agent is miscible with diethyl sulphate but is not miscible with alcohol, the distillate resulting after stripping can be hydrolyzed directly and the alcohol and stripping agent separated thereafter.

Gaseous stripping agents cannot be used as successfully in place of liquids according to the method of the present invention since such a procedure necessitates the use of vacuum pumps of much larger capacity. By using liquid stripping agents such as kerosene, the capacity of the required vacuum pump is maintained at a minimum.

The conditions obtaining during the distillation may be varied in known manner. The pressure at which the distillation is conducted may be higher or lower than 10 mm. of mercury. Low pressures are generally preferred because of the correspondingf reduction produced in the boiling point of the substance. In general, it may be said that the lower the temperature of distillation the less is the possibility for decomposition or polymerization of any of the constituents of the acid mixture. Variations of pressure during the distillation produce variations in the ratio of the diethyl sulphate to stripping agent in the gas phase during distillation and in the distillate. By such variation in pressure it is possible to control the constitution of the gas phase and provide only just sufficient stripping agent as is necessary to obtain advantageous results.

The present process is particularly adapted for use when the absorption of ethylene in sulphuric acid is conducted in the presence of catalysts dissolved in the acid. Since there is no dilution or concentration operation to which the acid is submitted, the catalyst remains in the acid ready for re-use.

An example of the preferred method of practicing the invention follows:

An acid mixture resulting from the absorption of ethylene in sulphuric acid had a titratable acidity (methyl red indicator) of 30%, calculated as sulphuric acid. Its specific gravity was 1.31 at 25° C. and it analyzed as follows:

| | Per cent |
|---|---|
| Diethyl sulphate | 41 |
| Ethylsulphuric acid | 47 |
| Sulphuric acid | 12 |

A commercial kerosene was treated with sulphuric acid to remove aromatic hydrocarbons and then distilled. The fraction which distills between 205° and 225° C. at a pressure of 750 mm. of mercury was collected. Its average molecular weight was 180, and it consisted principally of saturated aliphatic hydrocarbons containing 12 to 13 carbon atoms.

In a counter-current stripping tower maintained at 100° C. under a pressure of 4-17 mm. of mercury, is introduced a descending stream of acid mixture preheated to 100° C. and an ascending stream of the kerosene vapors preheated to 100° C. The vapors passing over at 100° C., consisting of kerosene with volatilized diethyl sulphate, are condensed and collected.

The ratio of acid mixture and kerosene introduced into the stripping tower and the pressure at which the stripping is conducted can be varied. The effects of such variation are indicated in the table which follows hereinafter opposite the designations A and B.

The distillate consists of two layers, a kerosene layer and a diethyl sulphate layer. The diethyl sulphate obtained contains approximately 5% dissolved kerosene. The acid residue resulting after stripping contains 56–65% titratable acid, and is undiluted with water.

Typical results obtained when a petroleum naphtha fraction with a boiling range of 130° to 140° C. at an absolute pressure of 750 mm. of mercury is used as the stripping agent are also shown in the table which follows opposite the designation C.

| Stripping agent | Pressure | Molecular ratio stripping agent: diethyl sulphate | | Diethyl sulphate ratio of recovered: original | Per cent titratable acid in residue |
|---|---|---|---|---|---|
| | | Introduced | Distillate | | |
| | mm. | | | | |
| A kerosene | 4 | 2.2:1 | 1.5:1 | 144:100 | 65 |
| B kerosene | 5 | 2.3:1 | 2.4:1 | 96:100 | 56 |
| C naphtha | 17 | 9:1 | 9:1 | 106:100 | 60 |

The diethyl sulphate containing dissolved kerosene or other stripping agent can then be hydrolyzed to ethyl alcohol in the usual manner. The dissolved kerosene separates out after hydrolysis and can be re-used for additional stripping. Diethyl sulphate or other dialkyl sulphates produced by this process, containing small amounts of kerosene or other stripping agents, can be used as alkylating agents without further purification.

The residual acid can be used for additional absorption of ethylene or, since it contains ethylsulphuric acid, can be hydrolyzed to ethyl alcohol in the usual manner, if desired.

The description is illustrative of the advantages accruing from the use of the invention for stripping diethyl sulphate from mixtures resulting from the absorption of ethylene in sulphuric acid and the direct application of this process to the production of ethyl alcohol. The application of the invention to the removal of dialkyl sulphates from mixtures resulting from the absorption of other olefins in sulphuric acid and the production of alcohols from the resulting compounds is also contemplated. Thus, the invention is applicable to the separation of di-isopropyl sulphate from the mixture resulting after the absorption of propylene in sulphuric acid.

Inasmuch as the specification comprises preferred embodiments of the invention, it is to be understood that the invention is not limited thereto and that changes and modifications can be made without departing substantially from the spirit of the invention which is defined in the appended claims.

What is claimed is:

1. The process which consists in stripping under subatmospheric pressure a dialkyl sulphate, in which the alkyl groups have less than 4 carbon atoms, from a mixture containing the dialkyl sulphate, the alkyl sulphuric acid and sulphuric acid, the stripping agent being a volatile organic liquid which is substantially non-reactive under the conditions of the process.

2. The process as defined in claim 1 and further characterized in that the stripping agent is selected from a group consisting of aromatic-free kerosene and a volatile liquid chlorinated hydrocarbon.

3. The process as defined in claim 1 and further characterized in that the stripping agent with which the dialkyl sulphate is volatilized is substantially immiscible therewith.

4. The process as defined in claim 1 and further characterized in that the stripping agent is an aromatic-free petroleum fraction within the kerosene boiling range.

5. A method of recovering diethyl sulphate from a mixture containing diethyl sulphate, ethylsulphuric acid and sulphuric acid, characterized in that the diethyl sulphate is distilled from said mixture at a subatmospheric pressure in the presence of a volatile organic liquid stripping agent, whereby at least part of the ethylsulphuric acid present in the mixture is converted to diethyl sulphate and said diethyl sulphate together with that originally present is volatilized by means of and subsequently recovered from the stripping fluid.

6. A method as defined in claim 5 and further characterized in that the stripping agent is an aromatic-free petroleum fraction within the kerosene boiling range.

7. In a process for the production of dialkyl sulphates in which the alkyl groups have less than 4 carbon atoms, dependent upon the absorption of an olefin in sulphuric acid to form monoalkyl and dialkyl sulphates, the improvement characterized in that the dialkyl sulphate formed in said absorption is separated from the acid mixture and the monoalkyl sulphate by distillation from said acid mixture at a subatmospheric pressure in the presence of a volatile organic liquid stripping agent, after which the dialkyl sulphate in the resulting distillate is separated from the stripping agent and the stripped acid mixture is subjected to further treatment with olefin for conversion to additional quantities of dialkyl sulphate.

8. The process as defined in claim 7 and further characterized in that the stripping agent is an aromatic-free, petroleum fraction within the kerosene boiling range.

CARLYLE J. STEHMAN.